United States Patent
Verde

(10) Patent No.: US 10,445,820 B2
(45) Date of Patent: Oct. 15, 2019

(54) SYSTEMS AND METHODS FOR FACILITATING PURCHASE USING GESTURE

(71) Applicant: PayPal, Inc., San Jose, CA (US)

(72) Inventor: Bret Christopher Verde, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 566 days.

(21) Appl. No.: 14/315,036

(22) Filed: Jun. 25, 2014

(65) Prior Publication Data

US 2015/0379619 A1 Dec. 31, 2015

(51) Int. Cl.
*G06F 3/0488* (2013.01)
*G06Q 30/06* (2012.01)

(52) U.S. Cl.
CPC ....... *G06Q 30/0641* (2013.01); *G06F 3/0488* (2013.01)

(58) Field of Classification Search
None
See application file for complete search history.

(56) References Cited

U.S. PATENT DOCUMENTS

| | | | | |
|---|---|---|---|---|
| 8,473,363 B1* | 6/2013 | Oakes, III | .......... | G06Q 30/0601 705/26.1 |
| 9,773,245 B1* | 9/2017 | Patel | .................... | G06F 3/04883 |
| 2005/0075940 A1* | 4/2005 | DeAngelis | ............. | G06Q 30/02 705/26.1 |
| 2007/0259717 A1 | 11/2007 | Mattice et al. | | |
| 2008/0059578 A1* | 3/2008 | Albertson | ............... | G06F 3/016 709/204 |
| 2009/0319181 A1 | 12/2009 | Khosravy et al. | | |
| 2012/0290391 A1* | 11/2012 | Rao | ........................ | G06Q 30/02 705/14.53 |
| 2013/0144759 A1 | 6/2013 | Toyomura et al. | | |
| 2013/0179303 A1* | 7/2013 | Petrou | .................... | G06Q 30/06 705/26.61 |
| 2015/0177937 A1* | 6/2015 | Poletto | .................. | G06F 3/0484 715/739 |

* cited by examiner

*Primary Examiner* — Paul Danneman
(74) *Attorney, Agent, or Firm* — Haynes and Boone, LLP

(57) ABSTRACT

A gesture profile may be set up for making a purchase. The gesture profile may define a gesture that triggers a purchase transaction. When the gesture is detected, a purchase target may be searched and identified. The purchase target may be purchased automatically using a payment method defined in the gesture profile. When multiple purchase targets are identified, a user selection may be received to select one or more purchase targets. The selected purchase targets may be purchased using the payment method defined in the gesture profile. Accordingly, a user may purchase a product or service by making a simple gesture on a mobile device.

20 Claims, 4 Drawing Sheets

SYSTEMS AND METHODS FOR FACILITATING PURCHASE USING GESTURE

BACKGROUND

Field of the Invention

The present invention generally relates to systems and methods for facilitating purchase using gesture.

Related Art

With modern technology, consumers have access to various marketplaces and merchants to make purchases. For example, goods and products are made available to consumers via not only brick-and-mortar stores but also online stores. Nevertheless, there remains some friction in making a purchase, e.g., between when a product or service is presented to a consumer to when the product or service is purchased by the consumer. For example, when a consumer hears a song on a radio and wishes to purchase a digital copy of the song, the consumer has to identify the song and find a merchant that offers the song for sale. The consumer also has to visit the merchant to pay for the song. These additional steps may hinder the consumer from making a purchase. Therefore, there is a need for a system or method that helps facilitate these additional steps in making a purchase.

Figure 1:
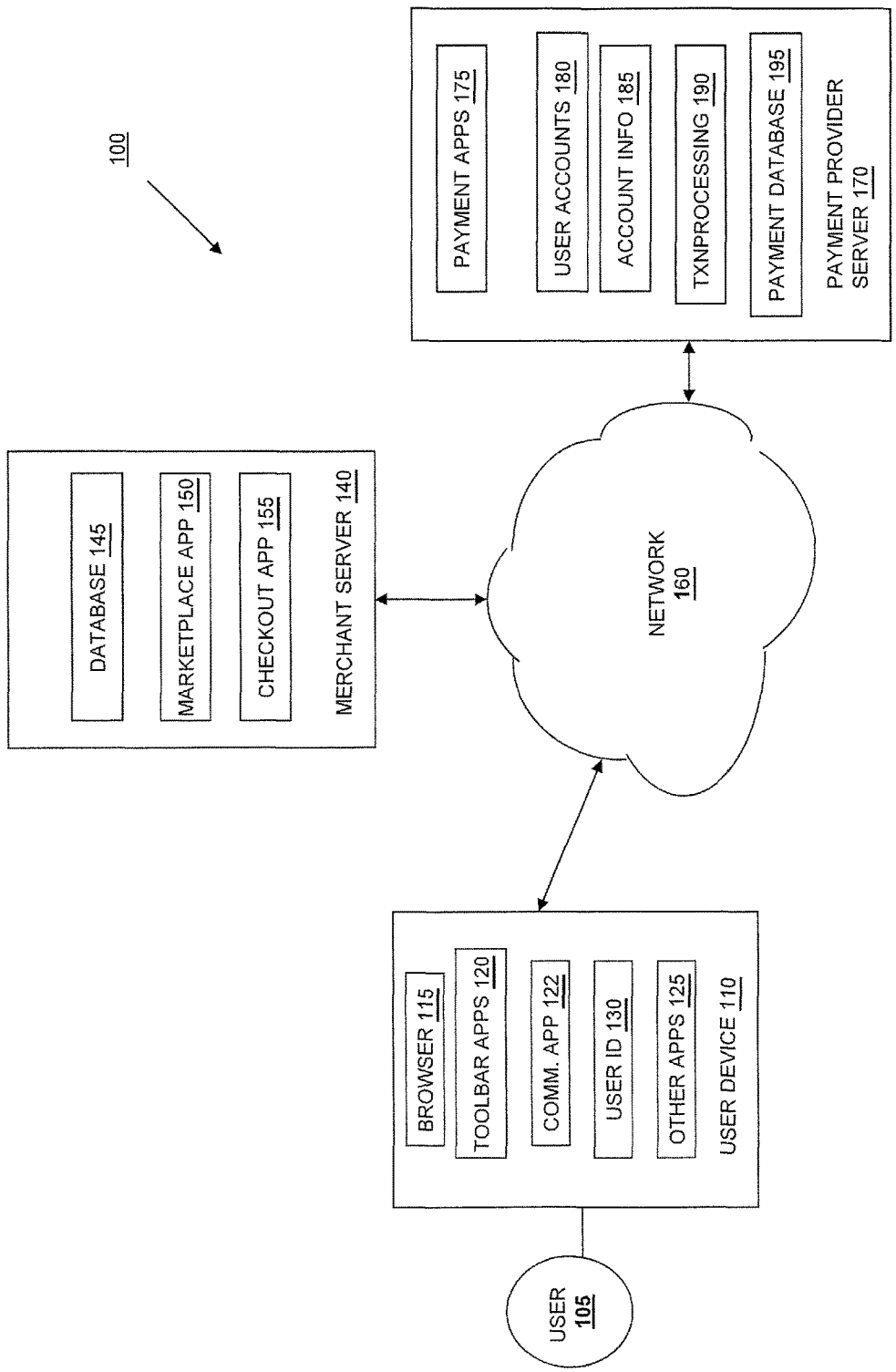
FIG. 1 is a block diagram of a networked system suitable for implementing a process for facilitating purchase using gesture according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a gesture profile may be set up for making a purchase. The gesture profile may define a gesture that triggers a purchase transaction. When the gesture is detected, a purchase target may be searched and identified. The purchase target may be purchased automatically using a payment method defined in the gesture profile. When multiple purchase targets are identified, a user selection may be received to select one or more purchase targets. The selected purchase targets may be purchased using the payment method defined in the gesture profile. Accordingly, a user may purchase a product or service by making a simple gesture on a mobile device.

FIG. 1 is a block diagram of a networked system 100 suitable for implementing a process for facilitating a purchase using gesture according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant server 140, and a payment provider server 170 in communication over a network 360. Payment provider server 170 may be maintained by a payment service provider, such as PayPal, Inc. of San Jose, Calif. A user 105, such as a sender or consumer, utilizes user device 110 to perform a transaction using payment provider server 170. A user 105 may utilize user device 110 to initiate a payment transaction, receive a transaction approval request, or reply to the request. Note that transaction, as used herein, refers to any suitable action performed using the user device, including payments, transfer of information, display of information, etc. For example, user 105 may utilize user device 110 to initiate a deposit into a saving account. Although only one merchant server is shown, a plurality of merchant servers may be utilized if the user is purchasing products or services from multiple merchants.

User device 110, merchant server 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, personal digital assistant (PDA), laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise utilize a smart wallet through the payment provider as discussed above. User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 also may include applications that monitor and/or detect user gestures. For example, user device 110 may include a touch screen that displays information to user 105 and receives user input from user 105. User device 110 may monitor user input on the touch screen and may recognize predetermined gesture to activate certain functions, e.g., purchase transactions. In one embodiment, user device 110 may include a camera configured to capture a gesture of user 105. In still another embodiment, user device 110 may include a motion detector, e.g., gyroscope, for detecting user device 110's movement. User device 110 may monitor the movement of user device 110 for any predetermined gestures made by user 105 that activate purchase transactions.

User derive 110 also may collect location data using Global Positioning System (GPS) to identify a location of user device 110. Other means for collecting location data, such as WiFi devices, Near-Field Communication (NFC) devices, or the like also may be included in user device 110 for determining a location of user device 110. Thus, user device 110 may determine a current location of user device 110 based on the collected location data. In another embodiment, user device 110 may send the location data to payment provider server 170 and payment provider server 170 may determine a current location of user device 110 based on the location data.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as banks and retailers. For example, a payment may be a donation to charity or a deposit to a saving account.

Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Account information may also include gesture profiles designating gestures that may trigger purchase transactions. The gesture may be a gesture made on the touch screen of user device 110, a movement of user device 110, or a gesture of user 105 captured by a camera of user device 110. Payment application 175 may be configured to interact with merchant server 140 on behalf of user 105 during a transaction with checkout application 155 to track and manage purchases made by users and which and when funding sources are used. Payment application 175 may be configured to determine the existence of and to manage accounts for user 105, as well as create new accounts if necessary. Payment application 175 may be triggered by a gesture made by user 105.

A transaction processing application 190, which may be part of payment application 175 or separate, may be configured to receive information from user device 110 and/or merchant server 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Transaction processing application 190 may be triggered by a gesture made by user 105.

Figure 2:
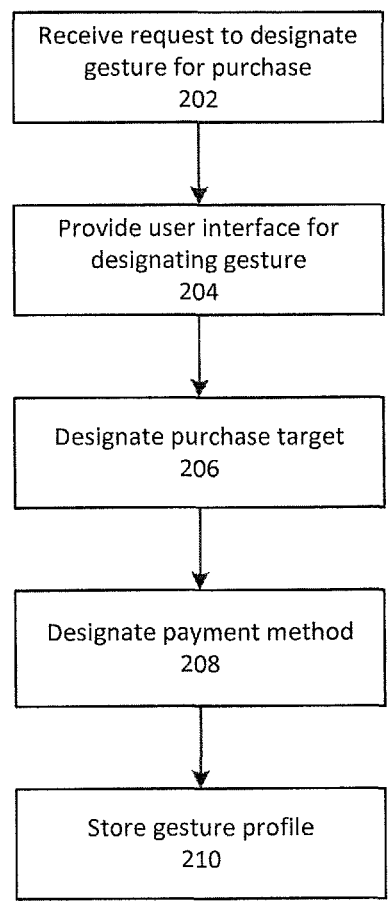
FIG. 2 is a flowchart showing a process for setting up a gesture profile for making a purchase according to one embodiment.

FIG. 2 is a flowchart showing a process 200 for setting up a gesture profile according to one embodiment. At step 202, payment provider server 170 may receive a request to designate a gesture for making purchase. For example, user 105 may wish to set up a gesture for making song purchases and may use user device 110 to send the request to payment provider server 170. In response to receiving the request, payment provider server 170 may generate a gesture profile form and send the gesture profile form to user device 110 at step 204.

The user may use the gesture profile form to designate a customized gesture and various settings for making purchases. The gesture profile may define a gesture that triggers a purchase transaction. For example, a gesture of a dollar sign, e.g., "$", on a touch screen of user device 110 may be designated for triggering a purchase transaction. Other gestures, such as a check mark, a symbol, a series of characters, or the like may be used for triggering a purchase transaction. In one embodiment, the gesture may be a hand gesture or a hand motion captured by a camera of user device 110. In another embodiment, the gesture may be a series of movement of user device 110. For example, user device 110 may be wearable device, such as a smart watch, and the user 105 may designate a gesture by moving the smart watch in a certain way.

In an embodiment, the gesture may be an interaction between two or more devices. For example, a car of the user 105 may be equipped with a gesture enabled console, which may be linked with a wearable device of the user 105. The user 105 may set up a gesture by moving the wearable device for controlling the gesture enabled console. Thus, when the user is driving and hears a song from the radio that the user 105 wishes to purchase, the user 105 may make the gesture with the wearable device to instruct the gesture enabled console to purchase the song. Thus, the user 105 may initiate a purchase without operating the console, such that the user 105 is not distracted when driving. In an embodiment, the gesture may be associated with an audio input. For example, a gesture may be associated with audio input of hand clapping, finger snapping, and the like. This may be utilized for vocally-challenged users.

User device 110 may be trained to recognize the designated gesture. For example, user 105 may be requested to demonstrate or input the designated gesture several times for user device 110 to capture and learn the designated gesture. At step 206, a purchase target may be designated for the gesture. The purchase target may be a type of goods or service. For example, the purchase target may be a song in either digital or analog format. If the purchase target is a musical song, user device 110 may search and discover musical songs being played by or around user device 110. In one embodiment, the purchase target may be goods or service associated with an application or web page being displayed by user device 110. For example, the purchase target may be goods or service displayed on a web page by a browser of user device 110.

In another embodiment, the purchase target may be associated with images of goods or services captured by the camera of user device 110. For example, the purchase target may be an image or a bar code of a product captured by the camera. The purchase target also may be a particular product or service from a particular merchant. For example, the purchase target may be a prescription medicine from a pharmacy. Thus, a gesture may be designated to make a routine purchase of the prescription medicine.

At step 208, one or more payment methods may be designated for making a purchase with gesture. The payment method may be a credit card, a debit card, a gift card, a checking account, or the like. The designated payment method may be used to make automatic payment for making a purchase. The designated payment method may be associated with the gesture profile.

At step 210, the gesture profile may be set up and stored at payment provider server 170. In another embodiment, the gesture profile may be stored at user device 110 and be accessible to applications executed at user device 110. Thus, user device 110 may monitor user input for ones that match the designated gesture.

By using the above process 200, a gesture profile for a gesture that triggers a purchase transaction may be set up and stored. The user may customize a gesture for specific purchase targets.

Figure 3:
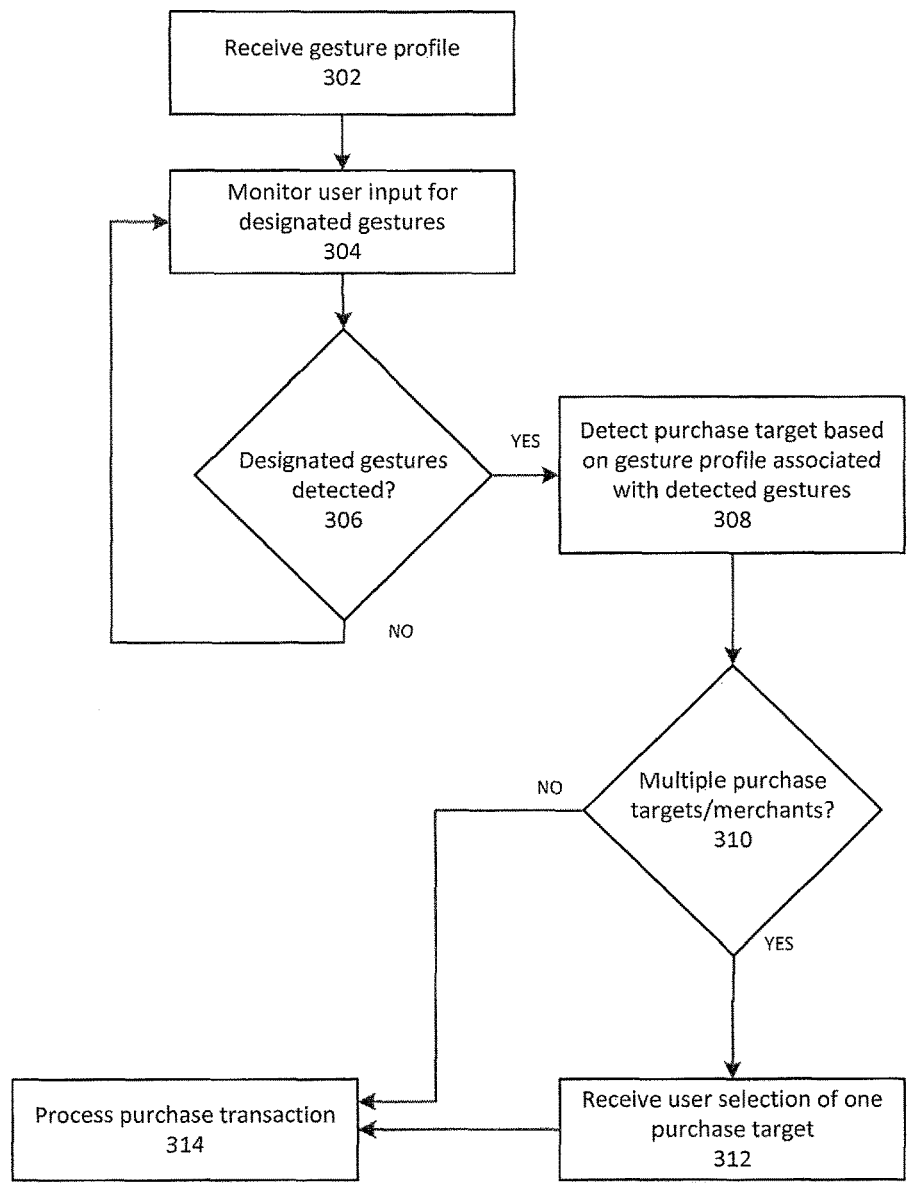
FIG. 3 is a flowchart showing a process for making a purchase using a gesture according to one embodiment.

FIG. 3 is a flowchart showing a process for making a purchase using a gesture according to one embodiment. At step 302, payment provider server 170 may receive a gesture profile from user 105. For example, after user 105 inputs various settings and parameters into a gesture profile form at user device 110, user device 110 may send the gesture profile to payment provider server 170. In one embodiment, the gesture profile may be stored at user device 110. At step 304, user device 110 may monitor user inputs for gestures designated by the gesture profile. For example, a camera or a touch screen of user device 110 may receive user gestures and may monitor for any user gestures that match the gesture designated in the gesture profile.

At step 306, user device 110 may determine whether a gesture designated in the gesture profile is detected. For example, user device 110 may receive user input on the touch screen and may analyze the user input to determine whether gestures that match the designated gesture in the gesture profile have been input by user 105. Matching gestures may be gestures that are substantially the same or similar to the designated gesture in the gesture profile. If no matching gestures are input by user 105, the process may return to step 304 in which user device 110 may continue to monitor and detect matching gestures.

If a gesture input by user 105 matches a gesture from a gesture profile at step 306, user device 110 may detect the purchase target defined in the gesture profile associated with the gesture at step 308. For example, if the gesture profile indicates that the purchase target is music, user device 110 may activate a sound sensor, e.g., a microphone, to detect music around user device 110. User device 110 also may determine music that is being played by user device 110. User device 110 may analyze the music to identify a song being played around or at user device 110. For example, user device 110 may access a song database to find a song that matches the melody of the song detected by user device 110. After identifying the song, user device 110 may search for a merchant that offers the song for sale. The merchant may offer the song in digital format for download or recorded in media, e.g., compact disk or cassette tape.

In an embodiment, when the gesture indicates music as the purchase target, the user device 110 may record the music being played using a sound sensor. The recorded portion of a song may later be used by the user 105 to identify the song. Thus, in a case when the user device 110 is not able to identify the song because the portion of the song is very short, e.g., at the end of the song, the user 105 may still be able to use the recorded portion to figure out the identity of the song.

In one embodiment, the gesture profile may indicate that the purchase target is an application executed by user device 110. User device 110 may search for possible goods or services that may be purchased as in-app purchases. For example, goods or services offered by the application, such as software upgrades or the like may be possible purchase targets. Further, goods or services offered by advertisements included in the application also may be possible purchase targets. User device 110 may analyze various possible purchase targets and present them in a list. User device 110 also may search for merchants that offer these goods or services for sale.

In still another embodiment, the gesture profile may indicate that the purchase target is associated with images or videos captured by the camera of user device 110. User device 110 may activate the camera and begin to capture images or videos. For example, the camera may capture an image or a bar code of a product. The camera also may capture texts related to products or services. User device 110 then may analyze the captured images to find possible purchase targets. For example, the bar code or image of the product may be used to identify the product. Merchants that offer the product for sale may then be found. User device 110 also may use location data of user device 110 to locate nearby merchants that offer the purchase targets for sale. A list of possible purchase targets and a list of nearby merchants and/or online merchants that offer the purchase targets for sale may be presented to user 105.

At step 310, user device 110 may determine whether multiple purchase targets are detected. If only one purchase target is detected, the purchase target may be purchased automatically using payment method defined in the gesture profile at step 314. For example, if the purchase target is a song and the gesture profile indicates that a preferred online merchant should be used to purchase songs, user device 110 may purchase the song from the preferred online merchant. If multiple purchase targets or multiple merchants are found at step 310, user device 110 may present a list of purchase targets detected along with a list of merchants that offer the purchase targets for sale. User device 110 may request that user 105 select the purchase targets and merchants to be purchased. User device 110 may receive user 105's selection at step 312. The selected purchase targets may then be purchased from the selected merchants at step 314.

By using the above process, a user may set up a customized gesture profile for making purchase. Purchase target also may be defined in the gesture profile. Thus, the user may make a purchase by making a simple gesture, without having to find the product and merchants that offer the product for sale. Further, the user may use a unique gesture to increase security and prevent unauthorized purchase.

The above steps in processes 200 and 300 may be executed at user device 110. In one embodiment, the above steps in processes 200 and 300 may be executed at service provider server 170. In another embodiment, one or more steps may be executed at user device 110 or merchant server 140 while other steps may be executed at payment provider server 170.

The following are exemplary scenarios in which the above processes 200 and 300 may be implemented.

EXAMPLE 1

The user enjoys music and has been buying and collecting songs using a mobile device. Thus, the user wishes to set up a gesture for purchasing songs to make the purchase easier and more convenient. The user requests to set up a gesture profile from a payment service provider. The payment service provider sends a gesture profile form to the user's mobile device for the user to fill out. The user uses the mobile device to enter settings and parameters for the gesture profile. The user designates a gesture for making a song purchase. In particular, the gesture is a G-clef musical sign made on a touch screen of the mobile device. The user also defines musical songs as the purchase target. Further, the user designates the user's payment account registered at the payment service provider as the payment method.

The payment service provider receives the gesture profile from the user and stores the gesture profile with the account of the user. The mobile begins to monitor the user's input to detect gestures that matches the G-clef musical sign. A few days later, the user is driving to work and hears a song on the radio that interests the user. The user wishes to purchase the song even though the user does not know the name of the song or which merchant offers the song for sale. The user makes the G-clef musical sign on the touch screen of the mobile device to activate a purchase for the song. The mobile device detects that a gesture similar to the G-clef musical sign has been made on the touch screen and determines that the G-clef musical sign is associated with the gesture profile for making a song purchase.

The mobile device then activates an application for identifying songs played around or at the mobile device. For example, the mobile device detects music by a built-in microphone. The mobile device receives the melody of the music and begins to analyze the melody to identify the song. The mobile device accesses a music database storing a plurality of song profiles and matches the melody to the songs in the database. The mobile device finds a match and identifies the song. The mobile device then searches for merchants that offer the song for sale. The mobile device finds a merchant that offers the song at a lowest price. The mobile device then activates a purchase application to buy the song from the merchant. In particular, the purchase application requests a payment service provider to process the purchase transaction. The payment service provider debits the payment account of the user and credits the merchant. After payment, the song is automatically downloaded to the mobile device. Thus, the user may have the song stored in the mobile device for listening enjoyment.

Accordingly, the user may make a song purchase by making a simple gesture on the mobile device. The mobile device may automatically analyze, identify, and purchase the song without further input from the user. Thus, the user may make a song purchase with ease and convenience. Further, the user is not distracted and can drive safely.

EXAMPLE 2

The user sets up a gesture profile for making purchases. The gesture profile defines images displayed on the user's mobile device as purchase targets. The user designates a dollar sign, e.g., "$", as the gesture for triggering a purchase transaction. When the user is reading a magazine using the mobile device, the user sees a pair of shoes and wishes to purchase the pair of shoes. The user makes a gesture of a dollar sign over the image of the pair of shoes displayed on the mobile device. The mobile device detects the user input and determines that the user input is a gesture that matches a dollar sign. A purchase transaction is then triggered by the gesture.

The mobile device captures the image displayed on the mobile device. In particular, the mobile device captures the image near the position of the screen where the dollar sign was input. The mobile device analyzes the image and determines that a pair of shoes, a pair of socks, and a foot stool are shown in the image. The mobile device accesses a database of apparel product images to search for images that match the pair of shoes, the pair of socks and the foot stool. The mobile device presents the product images that match the pair of shoes, the pair of socks, and the foot stool to the user. The user selects the product image that matches the pair of shoes. The mobile device then searches for merchants that offer the pair of shoes for sale. The mobile device provides a list of merchants to the user. The user selects a merchant from the list. The mobile device then automatically purchases the pair of shoes from the selected merchant.

Thus, the user may set up a gesture for making a purchase from images displayed on the mobile device. Further, the images may be analyzed to identify the product and merchant who offers the product for sale. Thus, the desired product may be purchased with ease.

Figure 4:
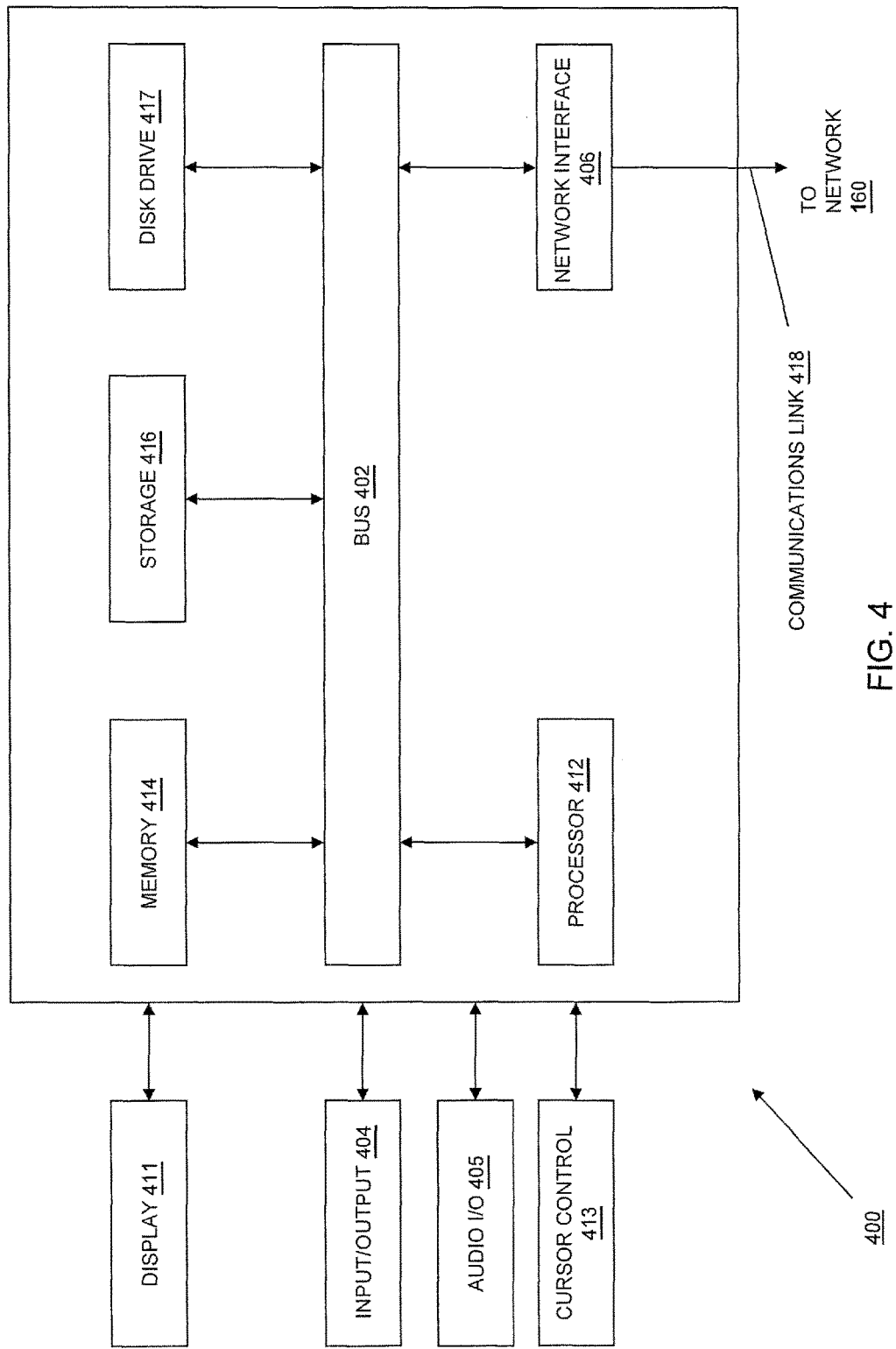
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, a wearable device, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402.

In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system for facilitating purchases using gestures, the system comprising:
   a non-transitory memory having stored thereon information related to a plurality of funding sources associated with a user and a gesture profile, the gesture profile defining a plurality of gestures, wherein each gesture defined in the gesture profile is associated with a purchase of a corresponding type of goods or services using a corresponding funding source associated with the user; and one or more hardware processors coupled with the non-transitory memory and configured to execute instructions to cause the system to perform operations comprising:

receiving gesture information corresponding to a gesture input detected on a touchscreen of a user device;

determining a portion of the touchscreen corresponding to the gesture input based on the received gesture information;

determining the gesture input matches a particular gesture from the plurality of gestures defined in the gesture profile;

determining a particular type of goods or services corresponding to the particular gesture;

causing a camera of the user device to capture an image, wherein the image is displayed on the touchscreen of the user device;

identifying a portion of the image corresponding to the portion of the touchscreen;

automatically identifying a plurality of products from the portion of the image;

selecting, from the plurality of products, a particular product based on the particular type of goods or services corresponding to the particular gesture; and processing a purchase transaction for the particular product.

2. The system of claim 1, wherein the operations further comprise:

in response to selecting the particular product, determining a merchant who sells the particular product, wherein the purchase transaction is associated with a purchase of the particular product from the merchant.

3. The system of claim 1, wherein the particular type of goods or services comprises music, wherein the operations further comprise:

activating a microphone of the user device;
receiving an audio recording via the microphone;
accessing a song database; and
identifying a song from the song database based on the received audio recording.

4. The system of claim 1, wherein automatically identifying the plurality of the products comprises:

extracting a code from the portion of the captured image;
accessing a product database; and
identifying the plurality of products by searching the product database based on the extracted code.

5. The system of claim 1, wherein the operations further comprise:

presenting information related to the particular product on the user device; and
receiving a user input confirming a purchase of the particular product.

6. The system of claim 1, wherein the gesture input comprises a symbol.

7. A method comprising:
receiving, by a computer system, gesture information corresponding to a gesture input detected on a touchscreen of a user device;
determining, by the computer system, a portion of the touchscreen corresponding to the gesture input based on the received gesture information;
determining, by the computer system, whether the gesture information matches a particular gesture from a plurality of gestures defined in a gesture profile associated with a user, wherein the gesture profile includes the plurality of gestures, wherein each gesture in the gesture profile is associated with a purchase of a corresponding type of goods or services;

in response to determining that the gesture information matches the particular gesture, determining, by the computer system, a particular type of goods or services corresponding to the particular gesture;

causing, by the computer system, a camera of the user device to capture an image, wherein the captured image is displayed on the touchscreen of the user device;

identifying, by the computer system, a portion of the image corresponding to the portion of the touchscreen;

automatically identifying, by the computer system, a plurality of products from the portion of the image;

selecting, by the computer system from the plurality of products, a particular product based on the particular type of goods or services corresponding to the particular gesture; and causing, by the computer system, a purchase transaction for the particular product to be processed.

8. The method of claim 7, further comprising:
in response to selecting the particular product, determining a merchant who sells the particular product; and
acquiring purchasing information about the particular product from a network site corresponding to the merchant.

9. The method of claim 8, further comprising presenting the acquired purchasing information on the touchscreen of the user device.

10. The method of claim 7, wherein the particular type of goods or services comprises music, and wherein the method further comprises:

activating a microphone of the user device;
receiving audio data via the microphone; and
identifying a song based on the received audio data.

11. The method of claim 7, wherein the computer system comprises the user device.

12. The method of claim 7, further comprising
presenting a list of the plurality of particular products on the touchscreen of the user device; and
receiving a user input confirming the particular product to be purchased from the list.

13. The method of claim 7, wherein causing the purchase transaction to be processed comprises transmitting a purchase request to a payment processor corresponding to a funding source associated with the user.

14. The method of claim 7 further comprising:
receiving, by the computer system, a request for setting up the gesture profile;
sending a gesture profile form to the user;
receiving the gesture profile from the user via the gesture profile form, the gesture profile defining the plurality of gestures; and
associating the particular gesture with the particular type of goods and services based on the gesture profile.

15. The method of claim 7, wherein the plurality of products are identified further based on the gesture input.

16. The method of claim 7, wherein the particular product is selected from the plurality of products further based on a location of the user device.

17. A non-transitory machine-readable medium having stored thereon machine-readable instructions executable to cause a machine to perform operations comprising:

receiving gesture data corresponding to a gesture input detected on a touchscreen of a user device associated with a user;

determining a portion of the touchscreen corresponding to the gesture input based on the received gesture data;

determining that the gesture data matches a particular gesture from a plurality of gestures defined in a gesture profile associated with the user, wherein the gesture profile includes the plurality of gestures, wherein each gesture in the gesture profile is associated with a purchase of a corresponding type of goods and services;

determining a particular type of goods or services corresponding to the particular gesture based on the gesture profile;

capturing an image to be displayed on the user device;

identifying a portion of the image corresponding to the portion of the touchscreen;

automatically identifying a plurality of products from the portion of the image;

selecting, from the plurality of products, a particular product based on the particular type of goods or services corresponding to the particular gesture; and causing the particular product to be purchased using a funding source associated with the user.

18. The non-transitory machine-readable medium of claim 17, wherein determining that the gesture data matches the particular gesture comprises determining that a detectable parameter of the gesture input falls within a data range for the detectable parameter associated with the particular gesture that is defined in the gesture profile.

19. The non-transitory machine-readable medium of claim 17, wherein causing the specific product to be purchased comprises determining that the funding source associated with the user is linked to the user device.

20. The non-transitory machine-readable medium of claim 17, wherein the particular product is selected further based on tactile data received from a sensory input device.

* * * * *